United States Patent [19]

Chi

[11] Patent Number: 5,784,711
[45] Date of Patent: Jul. 21, 1998

[54] DATA CACHE PREFETCHING UNDER CONTROL OF INSTRUCTION CACHE

[75] Inventor: Chi-Hung Chi, Croton-on-Hudson, N.Y.

[73] Assignee: Philips Electronics North America Corporation, New York, N.Y.

[21] Appl. No.: 80,438

[22] Filed: Jun. 21, 1993

Related U.S. Application Data

[63] Continuation of Ser. No. 605,212, Oct. 24, 1990, abandoned, which is a continuation-in-part of Ser. No. 526,341, May 18, 1990, abandoned.

[51] Int. Cl.⁶ ............................................... G06F 9/32
[52] U.S. Cl. ........................ 711/213; 711/204; 711/123; 711/126; 711/125
[58] Field of Search ..................... 364/200 MS File, 364/900 MS File, DIG. 1; 395/425, 421.03, 450, 464, 445; 711/213, 204, 123, 125, 126

[56] References Cited

U.S. PATENT DOCUMENTS

| | | |
|---|---|---|
| 4,371,927 | 2/1983 | Wilhite et al. |
| 4,437,149 | 3/1984 | Pomerene et al. ............... 395/389 |
| 4,719,568 | 1/1988 | Carrubba et al. ................ 711/123 |
| 4,821,185 | 4/1989 | Esposito ........................... 395/872 |
| 4,884,197 | 11/1989 | Sachs et al. ..................... 711/123 |
| 4,924,376 | 5/1990 | Ooi .................................... 395/383 |

OTHER PUBLICATIONS

IBM Technical Disclosure Bulletin vol. 15, No. 4, Sep. 1972, NY, USA pp. 1100–1101, "Storage Herarchy Control System".

IBM Technical Disclosure Bulletin vol. 32, No. 7, Dec. 1989, NY, USA pp. 274–275, "Cache Miss Leading Edge Processing".

*Primary Examiner*—Tod R. Swann
*Assistant Examiner*—J. Peikari
*Attorney, Agent, or Firm*—Brian J. Wieghaus

[57] ABSTRACT

A data prefetching arrangement for use between a computer processor and a main memory. The addresses of data to be prefetched are calculated by decoding instructions which have been prefetched by decoding prefetched instructions, the instructions having been in accordance with an intelligent prefetching scheme. The processor registers have two sections for respective access by the processor and a prefetch controller. The instruction registers may also contain an additional counter field which indicates the number of instruction cycles which must be executed before the register may be reliably utilized for prefetching data.

15 Claims, 2 Drawing Sheets

DATA CACHE PREFETCHING UNDER CONTROL OF INSTRUCTION CACHE

This is a continuation of application Ser. No. 07/605,212, filed Oct. 24, 1990, now abandoned, which is a continuation in part of application Ser. No. 07/526,341, filed May 18, 1990, now abandoned.

The invention relates to electronic computer systems. More particularly, the invention relates to a computer architecture which permits an efficient exchange of data between a relatively fast processor and a relatively slow memory.

BACKGROUND OF THE INVENTION

Rapid advances in integrated circuit technology and in computer architecture have resulted in an increasing "memory reference delay gap" between relatively fast processing units and relatively slow memory. High performance processor chips with maximum throughput over 100 MIPS are available as commercial products. Multiprocessor systems using these processor chips as their processing units can also be implemented. However, the memory system needed to support these high performance systems to run at their peak speed is either too complex or too expensive to be built. As a result, the performance bottleneck of many current high performance computer systems may not be the speed of their processing units, but rather the efficiency of the memory system.

Cache memory is a high speed buffer memory between the central processing unit and main memory of a computer system. Its purpose is to obtain high speed data/instruction accesses without the associated cost of building primary memory entirely using high speed technology. Cache memories are currently used in most computer systems, ranging from microprocessor chips to super computers. In future systems, cache effectiveness will be increasingly critical because processor computation speed is increasing at a much faster rate than memory access time.

In order to overcome the problem of increasingly large memory reference delay gaps between the fast processing units and slow memory, the prior art teaches a technique known as "cache prefetching" in which references are brought into the cache memory before they are actually needed. If the prefetching is correct, long memory reference delay times can be overlapped (partially or completely) with program execution. Thus, the number of cache misses visible to the processing unit can be reduced.

As used herein, the term "cache hit ratio" is defined as the probability that a data item requested by a processor unit will be found in cache memory and the "cache miss penalty" is defined as the time that the processing unit has to wait for the requested data item to arrive when a cache miss occurs. Efficient cache prefetching can improve the cache hit ratio, however, there is no guarantee that all prefetched data will be referenced at least once during the time they are in the cache. Incorrect data prefetching may generate excessive traffic on a data bus, waste cache memory space to store non-referenced data, and replace data in the cache that is going to be referenced with non-reference data. In other words, correct cache prefetching can improve machine performance while incorrect cache prefetching may deteriorate machine performance.

In many prior art instruction cache designs, cache prefetching systems effectively improve cache performance. However, data cache prefetching schemes are relatively much less efficient than instruction prefetching schemes and they sometimes decrease overall machine performance instead of increasing it. This is mainly due to problems of cache pollution and bus contention. Herein, "cache pollution" refers to the situation where data or instructions are fetched into the cache but are not referenced during the time they are in the cache. "Bus contention" is a situation where there are more requests trying to use the data bus than the bus can simultaneously serve. Compared to the behavior of instruction references, which are usually sequential in nature, the behavior of data references is more or less random. Since the reference behavior of data is much less predictable than the reference behavior of instructions, cache pollution occurs much more seriously in data cache prefetching than in instruction cache prefetching. Cache space is not only wasted to store prefetched non-referenced data, but data in the cache that are going to be referenced shortly might be replaced by the non-referenced data. Fetching of non-referenced data also create bus traffic. In systems where bus bandwidth is a limited resource, bus contention might happen and machine performance will be further deteriorated. If the bus is busy prefetching non-referenced data, other requests to use the bus (e.g. instruction fetching) will be delayed. This occurs very often in high performance processor chips where the processing speed can be very fast but the bus bandwidth is limited by its physical constraints, for example, the total number of pins on a chip. To overcome data cache pollution, a data cache prefetching scheme which can correctly prefetch data which is going to be referenced in the near future is needed.

DESCRIPTION OF THE PRIOR ART

Since the introduction of the cache in the 1960's, cache prefetching is often used to hide the memory access delay from the processor by overlapping access delay time with program execution. Memory cycles which would otherwise be idle are used for copying data and instructions into the cache. Some of the most commonly used prior art cache prefetching techniques are:

ONE BLOCK LOOK-AHEAD—when cache block i is referenced and is not in the cache (i.e. a cache miss occurs), cache block i and cache block i+1 are both fetched into the cache;

CACHE BLOCK SIZE GREATER THAN ONE—when a cache with block size greater than one is used, more than one item are fetched into the cache upon a cache miss which is due to the reference of only one item within the block that is fetched; and ALWAYS PREFETCHING—for every memory reference in block i, block i+1 is prefetched into the cache if it is not already in the cache.

As used herein, "cache block size" is defined as the basic unit of information transfer between the cache and the main memory. A "basic block" is defined as a sequence of code instructions with one entry point and one exit point.

The rationale for all these prefetching techniques is based on the spatial locality of the references, that is the loci of references of a program in the near future are assumed to be likely to be near the current loci of a reference. They make an assumption that memory accesses have the property of sequential order of referencing. In instruction caches, these prefetching techniques usually perform well because instruction references usually have the sequential reference behavior. For example, within a basic block, instructions are always referenced sequentially. Usually, the cache hit ratio is improved and the bus traffic is increased in instruction cache prefetching.

However, sequential prefetching schemes lose their effectiveness in data cache designs, because all of these techniques are primarily designed for instruction cache and their rationale are based on the reference behavior of instructions. Since the reference behavior of data, which is somewhat random, it is quite different from the reference behavior of instructions, which is sequential, applying prefetching schemes which are designed for sequential references to data caches is much less effective. The chance for the prefetched data to be referenced during the period it is in the cache is much lower in data caches than in instruction caches. Moreover, due to the limited space for data caches, pollution in data caches means that data in a cache which is going to be referenced shortly might be replaced by the "non-referenced prefetched data", resulting in cache misses. Unless there is some way to obtain a better idea of how data is referenced, cache data prefetching will not be very useful.

Another technique which tries to hide memory access time from program execution is the scheduling of LOAD instructions of a program by the compiler. In some RISC (Reduced Instruction Set Computer) architectures, the compiler tries to schedule the LOAD instruction of a datum i so that the time between the load for i and the first use of datum i is at least greater than the time needed to fetch datum i from the memory. In an ideal situation, all LOAD instructions can be scheduled in this way and all memory reference delay time can be invisible to program execution. Data are prefetched into registers (in contrast to the data cache) before they are needed with the help of the compiler and both the data cache and its prefetching scheme seem to be unnecessary. However, in practice, this is not true for the following reasons.

First, even if the compiler can schedule all LOAD instructions so that the time between the LOAD for datum i and the first use of datum i is greater than the memory access time for datum i, the problem of bus traffic still remains. Due to the limited number of registers available to the system, registers have to be reused and store only those values that are going to be referenced in the immediate future. In other words, data still have to be fetched from main memory when they are needed. Good register allocation schemes might be able to overlap memory access delay times with program execution time, but it cannot eliminate most of the bus traffic. Since the register file is too small to serve as backup storage for data that might be referenced far away from the current execution point, a data cache is still necessary to reduce bus traffic.

Second, overlapping memory access delay time of LOAD instructions with program execution might not always be possible. Due to the reuse of limited number of registers and the dependence among data, there is an important constraint for instruction scheduling: the LOAD instruction for register $R_i$ cannot be moved beyond an instruction which uses the old value of register $R_i$. Hence, there is a limit to the size of the gap between the load instruction for register $R_i$ and the first use of $R_i$ and this limit might not always be greater than the memory access time. As the memory access time relative to process cycle time increases, the chance of hiding memory access delay time completely from program execution decreases. However, this problem does not exist in cache management. Fetching a datum that is going to be put into register $R_i$ into the cache can occur in parallel with the access of register $R_j$. Thus, data prefetching is still very useful for reducing processor idle time due to memory accesses.

Third, moving LOAD instructions beyond a basic block may create the problem of correctness of program execution in FIG. 1. If some instruction is moved from one basic block $B_i$ to another basic block $B_j$, execution of any program control path which only executes block $B_j$ and not block $B_i$ will result in a wrong answer. This problem does not occur in cache management. If the cache management scheme tries to prefetch data according to one program execution path while the actual program execution is along another path, machine performance may be affected, but not correctness of program execution.

Fourth, due to the definition of the instruction set of a processor, separation of the LOAD for datum i from the first use of datum i might not always be possible. For example, in CISC (Complex Instructions Set Computer) Architectures, the operand of some arithmetic or logic operations can be of direct memory access. As a result, using compiler scheduling to overlap the memory operand access time with program execution becomes impossible.

SUMMARY OF THE INVENTION

With developments of new instruction cache designs (such as compiler-driven cache controls and multi-buffer on chip instruction cache) and branch target prediction techniques, instruction cache prefetching can be performed very accurately and much earlier than it is referenced. This results in the feasibility of deriving hints about how data is going to be referenced from prefetched instructions which have a high probability to be referenced in the immediate future. This information is very important to data cache prefetching because it provides a better way of predicting data reference behavior than simple guessing mechanisms such as one block look ahead or always prefetching, which are only good for sequential references.

An object of the invention is to provide a data cache prefetching scheme which fetches data which will be used soon thereafter.

Another object of the invention is to provide a data cache prefetching scheme which can be initiated automatically without using explicit cache control instructions and without waiting for a cache miss.

Another object of the invention is to reduce the average number of data cache misses and if a cache miss cannot be avoided, to overlap memory access delay time with program execution.

Another object of the invention is to avoid prefetching data which will not be referenced during the time it is in a cache.

These and other objects of the invention are implemented using an architecture termed "current window data cache prefetching" or "CWD prefetching". An "intelligent" instruction cache prefetching scheme (for example one of the schemes described in copending application Ser. No. 526,341, filed May 18, 1990 now abandoned) is used to prefetch with high accuracy instructions which are expected to be executed in the next few cycles. Using special hardware support, these prefetched instructions are predecoded to find out all (if any) data references that might be made by the prefetched instructions. Any expected data references in the prefetched instructions, in turn, are prefetched into the data cache.

Address calculation of data references in prefetched instructions can be performed in a cache control unit. When the instruction which is expected to be executed in the next few cycles is determined by the prefetching unit of the instruction cache, it is sent to the cache control unit where it is predecoded to determine the address of any possible data reference. In the CWD prefetching scheme, the address modes of data references can be classified into three categories:

IMMEDIATE ADDRESSING MODE—In this addressing mode, the value of the operand is specified in the instruction. There is no operand address under this addressing mode.

DIRECT ADDRESSING MODE—In this addressing mode, the address of the operand is specified within the instruction. Assuming a non-self-modified instruction set, the operand address will not be changed during the program execution.

INDIRECT ADDRESSING MODE—In this addressing mode, the address of the operand is a function of the values of some registers (e.g. indexed or based registers) and/or memory locations. Since the values of registers can be modified during program execution, an operand address of this kind of data reference is not fixed. Usually, it will point to several different memory locations as the program executes.

Each of these three addressing modes of data references has different requirements to the hardware support for the address calculation for data references (other than the hardware support for the predecoding of prefetched instructions) in the CWD prefetching scheme.

For immediate addressing mode data references, no additional hardware support is necessary because there is no operand address. For the direct addressing mode data references, again no additional hardware support is needed because the address of the operand is specified in the instruction and no calculation of the address is necessary in the CWD prefetching scheme.

For the indirect addressing mode of references, since the operand address is a function of the values of some registers such as the base register or the index register, the CWD prefetching scheme needs to access the register file in its address calculation. As a result, a multi-read-port register file is needed because the processing unit might need to access the register file at the same time the data cache control unit tries to read the register file for the address calculation of expected data references. Furthermore, if a read request and a write request arrive at the register simultaneously, the two requests need to be served serially. The write request first, followed by the read request. Some computation capability is also needed in the data cache control unit because of the address calculation.

Once the address $A_i$ of a data reference in a prefetched instruction I is found, a data prefetching request for the content of location $A_i$ will be sent out as soon as possible so that there is more time to do the data prefetching. However, there are situations where the datum obtained by prefetching the content of a memory location $A_i$ is not what is actually referenced during the execution of instruction I.

If the references use the indirect addressing mode, calculation of addresses of a data reference $A_i$ in a prefetched instruction I is based on the values of some index and based registers, $R_i \ldots R_n$. In order to make sure that there is enough time to fetch the datum, the prefetching request needs to be issued a few instructions ahead. That means that there is a certain time gap between the issue of the prefetching request for the contents of memory location $A_i$ and the execution of instruction I. However, during the time gap, there is no guarantee that the values of some of the registers, $R_1 \ldots R_n$ will not be changed. If the values of all the registers that are used for the calculation of address $A_i$ remain unchanged, the prefetched datum is what is needed for the execution of instruction I. However, it is also possible that some of the registers used for the calculation of address $A_i$ are modified during the time gap. If this happens, the prefetched datum is not what is needed for the execution of instruction I. It is because old values of registers $R_1 \ldots R_n$ are used for the address calculation of data while new values of register $R_1 \ldots R_n$ are used for the address calculation of the actual data reference of a location $A_i$. This is the most important and difficult issue which is handled by the CWD prefetching scheme.

BRIEF DESCRIPTION OF THE DRAWINGS

The invention will be described by reference to the drawings in which.

DESCRIPTION OF PREFERRED EMBODIMENTS

Figure 1:
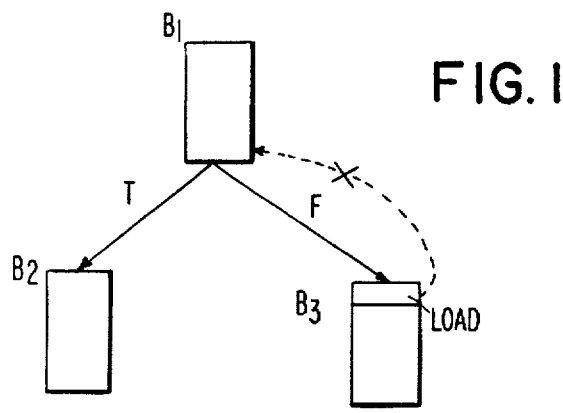
FIG. 1 illustrates difficulties with prior art register preloading techniques.
Figure 2:
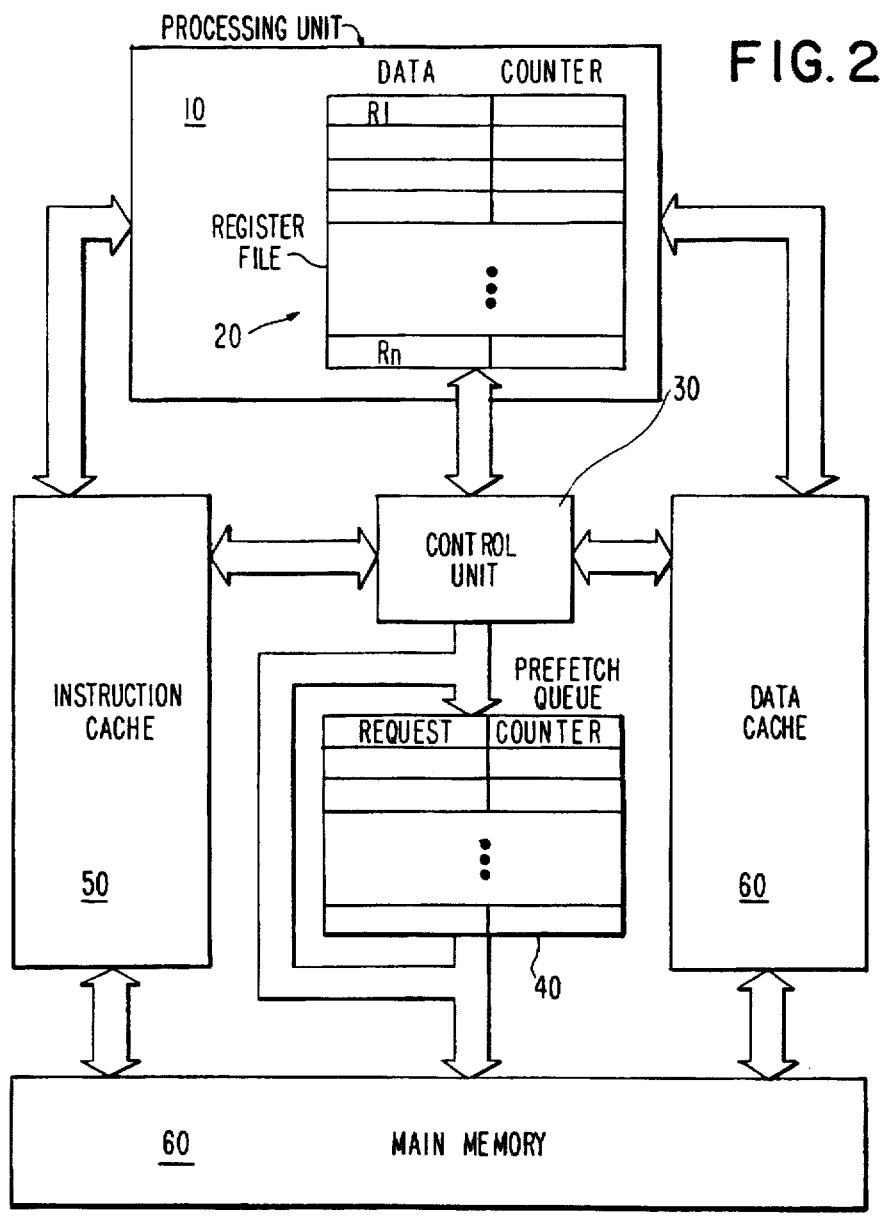
FIG. 2 illustrates an accurate but somewhat complex embodiment of the invention.

FIG. 2 illustrates an accurate, but somewhat complex, embodiment of the invention. A processing unit 10 of a computer includes a register file 20 having register cells $R_1 \ldots R_n$. Each register cell in the register file 20 has two fields, a data field and a counter field. As is usual, the data field of each register cell contains the value stored in that register. The counter field of a register is used to indicate the number of cycles that any data prefetching request must wait before it can be sent out, if the data prefetching request needs to use the register in its address calculation. The counter field is updated or set by a cache control unit 30. Whenever there is a write operation to the register in a prefetched instruction, its counter field is set $T_{ahead}$ where $T_{ahead}$ is the number of instructions that the CWD prefetching scheme looks ahead. This is to indicate that the new value of the register is available only $T_{ahead}$ cycles later. A zero value in the counter field of a register means that its value is ready to be used for any address calculation needed for data prefetching. After each instruction execution, the counter field of each of the registers in the register file has to be updated by decrementing it by one (if it is not zero). A prefetch queue 40 is used to hold those data prefetching requests that are waiting to be sent out because, either the values for registers needed for their address calculation are not ready or because the bus is busy. When a data prefetching request is put into the prefetch queue 40 because the values of some registers needed for its address calculation are not ready, a counter field in a prefetch queue is set to the maximum of those values of the counter fields of registers used in its address calculation. This is to indicate that the time that the prefetching request has to wait before its address can be recalculated. Once the counter of a prefetching request in the prefetch queue is zero, its prefetching address will be recalculated and the request will be sent out. Note that after each instruction execution, the counter field of each prefetching request in the prefetch queue needs to be updated by decrementing it by one (if it is not zero), the same operation that is done with the counter fields of the registers.

Whenever a branch occurs, the counter fields of all registers are reset and all prefetching requests that are put in the prefetching queue before the branch will be removed. This is because all these counter fields and prefetching requests only show correct hints about the future data reference if program execution continues along the path that is immediately following the branch. Thus, once a branch takes place, all these hints become useless and must be removed.

The control mechanisms for the first embodiment of the CWD prefetching are summarized as follows:

Instruction I, which is expected to be executed in the next $T_{ahead}^{th}$ cycle, is sent to the cache control unit either from the instruction cache 50 (if there is an instruction cache prefetch hit) or from the main memory 60 (if there is an instruction cache prefetch miss).

Prefetched instruction I is predecoded in the cache control unit 30 to find out any register that is going to be updated and any data reference that will be made if instruction I is executed.

If there is some register $R_i$ that is going to be updated by the execution of the prefetched instruction I, the counter field of register $R_i$ is set to $T_{ahead}$, where $T_{ahead}$ is the number of cycles that the CWD prefetching scheme looks ahead.

If there is some data reference $D_i$ made by the prefetched instruction I, a data prefetching request might be issued. If the expected data reference $D_i$ is of immediate addressing mode, no prefetching request is sent. If the expected data reference $D_i$ is of direct addressing mode, data cache is checked to see if $D_i$ is already in cache 60. A prefetching request of $D_i$ is sent out only if there is a prefetch cache miss for $D_i$. If the expected data reference $D_i$. is of indirect addressing mode and if the counter fields of all registers used in the address calculation of $D_i$ is zero, the data cache 60 is checked to see if $D_i$ is already in cache 60. If it is already in the cache, the prefetching request for $D_i$ will be aborted. If it is not in the cache, the prefetching request for $D_i$ will be sent out to the main memory as soon as the bus is free.

If there is some data reference $D_i$ made by the prefetched instruction I but some of the counter fields of the registers used in the address calculation of $D_i$ are not zero, the prefetching request for $D_i$ will be placed in a prefetch queue 40 and its counter field is set to the maximum of those non-zero values of registers used in the address calculation of $D_i$.

After each instruction, all counters, both in the register file 20 and in the prefetch queue 40 are decremented by one (if they are not already zero).

Whenever the counter field of a prefetching request in the prefetch queue is zero, its effective address is re-calculated and a data prefetching request is sent out using the new calculated address as soon as the bus is free.

If there is some new request for some functional unit of the system to use the bus while a data prefetching is in progress, the data prefetching will be aborted if one of the following situations occurs:

1. The new request is an instruction cache miss, or
2. The new request is a data cache miss and the new request is not the same as the current data prefetching request (control unit 30 keeps an account of what data prefetching request is being served and the unit will compare the two requests to see if they are the same) or
3. Other requests with higher interruptible priorities such as traps or unmaskable interrupts are generated by the system.

If a branch takes place, all prefetching requests that are placed in a prefetch queue before execution of the branch instructions are removed from the prefetch queue.

Figure 3:
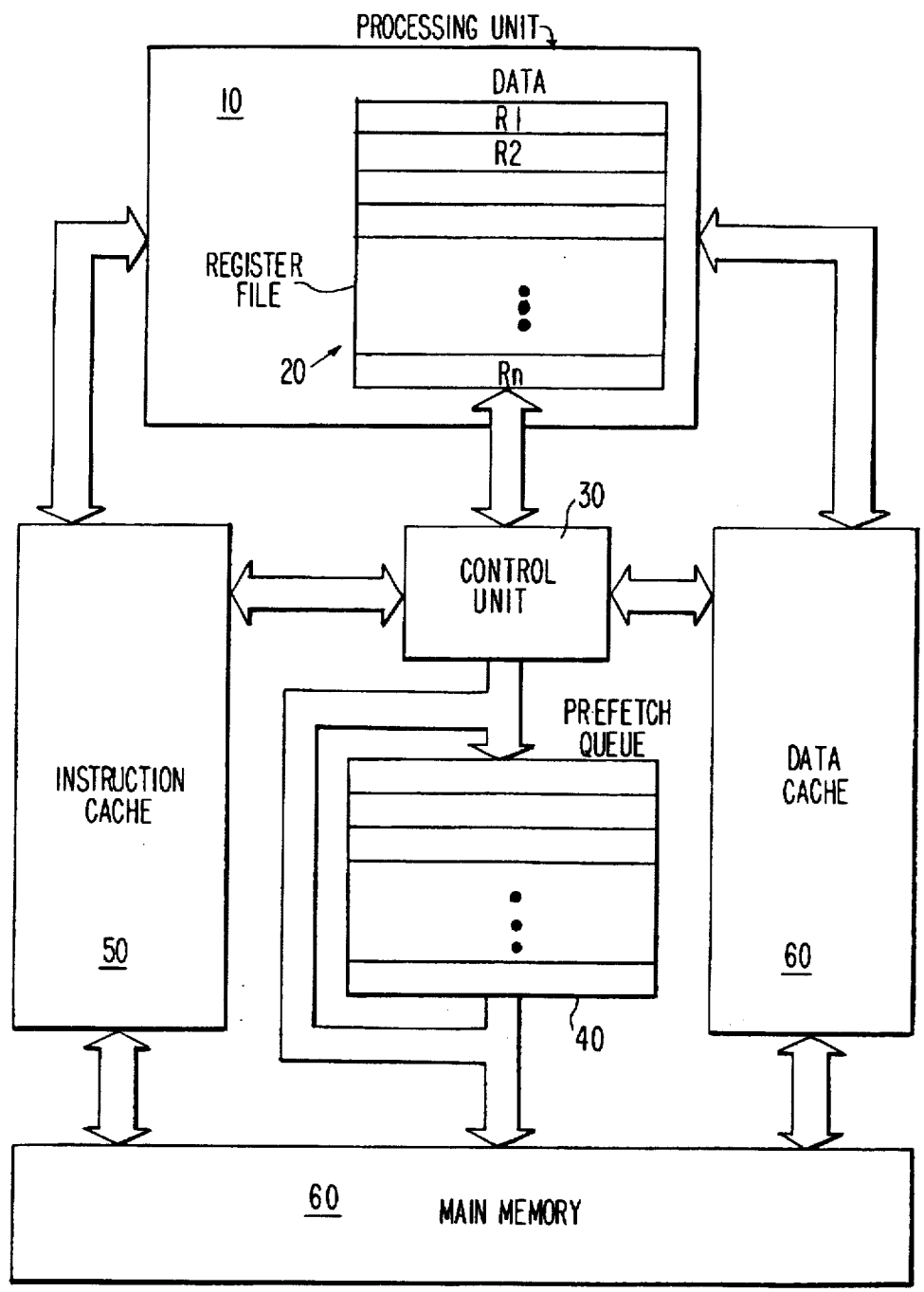
FIG. 3 illustrates a simpler, but somewhat less accurate embodiment of the invention.

FIG. 3 shows a simplified embodiment of a computer with CWD prefetching. The main advantage of the embodiment of FIG. 3 over the embodiment of FIG. 2 is that the control mechanisms and hardware support are much simpler. Compared with FIG. 2, the distinct feature of the FIG. 3 embodiment is that there is no bookkeeping of when registers are going to be updated and when prefetching requests can be sent out. The FIG. 3 embodiment only tries to find out if there is any data reference in the prefetched instruction I. If there is some data reference in the instruction, its address $A_i$ is calculated immediately using the current values of registers in the register file if it is necessary. Then the cache is checked to see if the content of location $A_i$ are already in the cache. If there is a prefetch miss, a prefetch request for location $A_i$ is put in the prefetch queue and will be sent out once the bus is free. The control mechanism for the FIG. 3 embodiment can be summarized as follows:

Instruction I, which is expected to be executed in the next $T_{ahead}^{th}$ cycle, is sent to the data cache control unit either from the instruction cache (if there is an instruction cache prefetch hit) of from the main memory (if there is an instruction cache prefetch miss), where $T_{ahead}$ is the number of cycles that the CWD prefetching scheme looks ahead.

Instruction I is predecoded in the cache control unit 30 and the address of any data reference $D_i$ made by instruction I is found using current values of some registers in a register file 20 if necessary.

If there is some data reference $D_i$ in instruction I, the data cache 60 is checked to see if $D_i$ is in the cache. If $D_i$ is already in the cache, the prefetching request is ignored. On the other hand, if data $D_i$ is not in the cache, a prefetching request for datum $d_i$ is put in the prefetch queue 40. Prefetching request for datum $D_i$ will start once the bus is free.

If there is a new request for some functionally unit of the system to use the bus while a data prefetching is in progress, the data prefetching will be aborted if one of the following situations occurs:

1. The new request is an instruction cache miss, or
2. The new request is a data cache miss and the new request is not the same as the current data prefetching request, or
3. Other requests with higher interruptible priorities such as traps or unmaskable interrupts occur from the system.

If a branch takes place, all prefetching requests that are placed in the prefetch queue before execution of the branch are removed from the prefetch queue.

Since all bookkeepings of when registers are going to be updated and when the prefetching request can be sent out are not present in the FIG. 3 embodiment, the prefetched datum due to instruction I might not be the same datum that is actually referenced during the execution of instruction I. However, the situation is not as bad as it might be. Since the time gap $T_{ahead}$ between the prefetching of datum $D_i$ and the actual reference of $D_i$ is only a few instructions. The chances for this incorrect data prefetching are not high. The compiler can also help avoiding this situation by moving those instructions that update registers used for address calculation of the CWD prefetching scheme to occur earlier. Furthermore, a data reference pointer is usually updated by a constant. Thus, if old values of the registers are used in the address calculation for the data prefetching in the CWD scheme, the resulting reference address should point to a datum that has already been fetched into the data cache. In this case, no prefetching will be sent out and no data cache pollution will occur.

I claim:

1. A method for operating a digital computer having a processing unit with first instruction decoding means, a main memory, an instruction cache and a data cache, said method comprising the steps of:

prefetching instructions from the main memory into the instruction cache;

providing a cache control means coupled to the instruction cache, data cache and main memory, the cache control means including second instruction decoding means for decoding prefetched instructions in the instruction cache;

decoding prefetched instructions in the instruction cache with the second decoding means of the cache control means to determine if any data stored in the main memory is referenced by a decoded prefetched instruction in the instruction cache;

prefetching data from the main memory into the data cache according to the decoded prefetched instructions decoded by said cache control means; and decoding and executing the instructions in the instruction cache with said first decoding means of said processing unit subsequent to said decoding by said cache control means.

2. The method of claim 1 further comprising the step of determining if any of the prefetched instructions in the instruction cache directly reference data stored in the main memory, and for each direct data reference, sending a data prefetching request to the main memory.

3. The method of claim 1 further comprising the steps of determining if any of the prefetched instructions in the instruction cache indirectly reference data stored in the main memory on the basis of registers in the processing unit and, for each register in the processing unit, storing a count of the number of processor cycles which must pass before the register can be utilized for accurate indirect address calculation.

4. The method of claim 3 further comprising the step of maintaining data prefetch requests in a queue corresponding to a counter which indicates the number of instructions which must be passed before each prefetching request can be implemented.

5. The method of claim 4 wherein the counter associated with a data prefetch request in the prefetch queue is initially set to the highest number of processor cycles of the counter field stored for registers used for indirect address calculation by the prefetched instruction requesting the data.

6. In a digital computer comprising a processing unit which includes a register file having one or more registers, a main memory for containing instructions and data for use by the processing unit, an instruction cache for holding instructions fetched or prefetched from the main memory for the processing unit, and a data cache for holding data prefetched from the main memory for the processing unit, wherein the improvement comprises:

a data cache control unit for decoding prefetched instructions in the instruction cache, prior to processing by said processing unit, to determine if any data stored in the main memory is referenced in said instructions, and each of the registers comprising two ports, a first port giving register access to the processing unit and a second port giving register access to the data cache control unit so that said processing unit and said data cache control unit have access at the same time to said registers.

7. The computer of claim 6, wherein the register file comprises registers each having a data field for storing data and a counter fields, and wherein the data cache control unit places, in the counter field of each register, a value representing the number of instruction cycles which must be completed before the data of the register may be reliably used for data prefetching.

8. The computer of claim 7 further comprising means for decrementing by one each non-zero counter field after an instruction is executed.

9. A digital computer, comprising:

a processing unit which includes a register file comprising one or more registers each having a data field for storing data and a counter field;

a main memory for storing instructions and data for use by the processing unit;

an instruction cache for holding instructions which are fetched or prefetched from the main memory for use by the processing unit;

a data cache for holding data prefetched from the memory for use by the processing unit; and a control unit which places in the counter field of each register, data representing the number of instruction cycles which must be completed before data previously stored in the data field in the respective register may be reliably used for data prefetching.

10. A digital computers, comprising:

a processing unit for processing instructions;

a main memory;

instruction cache means for prefetching processing unit instructions from the main memory;

means for decoding prefetched instructions in the instruction cache, prior to processing of said instructions by said processing unit, for determining if any data stored in the main memory is referenced in those instructions; and data cache means connected to prefetch data from the main memory according to the decoded prefetched instructions.

11. The computer of claim 10 further comprising:

one or more registers in the processing unit;

means connected to determine if any of the prefetched instructions in the instruction cache indirectly reference data on the basis of the registers in the processing unit; and first counter means connected to each register to maintain a count of the number of processor cycles which must pass before the register can be utilized for accurate indirect addressing.

12. The computer of claim 11 further comprising means connected to determine if any of the prefetched instructions in the instruction cache directly reference data stored in the main memory.

13. The computer of claim 12 further comprising second counter means connected to the prefetch queue to indicate the number of processor cycles which must pass before each data prefetch request in the queue can be implemented; and means which initially set the number of cycles for a data prefetch request by the second counter means to the stored in the registers used for indirect addressing.

14. The computer of claim 10 comprising means which alternatively send out a data prefetching request or put the request into a prefetch queue is there is data referenced in a direct addressing mode in the decoded prefetched instruction.

15. The computer of claim 11 comprising:

means connected to maintain data prefetch requests in a queue; and second counter means connected to indicate the number of processor cycles which must pass before each data prefetch request in the queue can be implemented.

* * * * *